US012116942B1

(12) United States Patent
Matsuura et al.

(10) Patent No.: US 12,116,942 B1
(45) Date of Patent: Oct. 15, 2024

(54) ENGINE CONTROL APPARATUS

(71) Applicant: Honda Motor Co., Ltd., Tokyo (JP)

(72) Inventors: Katsuya Matsuura, Wako (JP); Kohtaro Hashimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/587,414

(22) Filed: Feb. 26, 2024

(30) Foreign Application Priority Data

Mar. 28, 2023 (JP) ................................ 2023-051060

(51) Int. Cl.
*F02D 19/00* (2006.01)
*F02D 19/06* (2006.01)
*F02D 41/40* (2006.01)
*F02P 5/15* (2006.01)
*F02D 41/38* (2006.01)

(52) U.S. Cl.
CPC ....... *F02D 19/061* (2013.01); *F02D 19/0649* (2013.01); *F02D 19/0671* (2013.01); *F02D 19/0694* (2013.01); *F02D 41/401* (2013.01); *F02P 5/1502* (2013.01); *F02D 2041/389* (2013.01); *F02D 2200/021* (2013.01)

(58) Field of Classification Search
CPC ............... F02D 19/061; F02D 19/0649; F02D 19/0671; F02D 19/0694; F02D 41/401; F02D 41/389; F02D 2200/021; F02D 2041/389; F02P 5/1502
See application file for complete search history.

(56) References Cited

U.S. PATENT DOCUMENTS

| | | | | |
|---|---|---|---|---|
| 7,017,530 B2 * | 3/2006 | Hashimoto | ............ F02M 27/02 | 123/304 |
| 7,360,509 B2 * | 4/2008 | Hashimoto | ............. F02D 19/12 | 123/27 R |
| 2006/0185625 A1 * | 8/2006 | Hashimoto | ......... F02D 19/0671 | 123/3 |
| 2022/0235728 A1 * | 7/2022 | Hashimoto | ......... F02D 41/3035 | |
| 2022/0235729 A1 * | 7/2022 | Hashimoto | ........ F02M 37/0047 | |

FOREIGN PATENT DOCUMENTS

JP 2019105227 A 6/2019

* cited by examiner

*Primary Examiner* — Phutthiwat Wongwian
*Assistant Examiner* — Sherman D Manley
(74) *Attorney, Agent, or Firm* — Duft & Bornsen, PC

(57) ABSTRACT

Engine control apparatus includes: engine including injector configured to inject fuel into combustion chamber and ignition plug configured to ignite air-fuel mixture of fuel and air in combustion chamber; temperature sensor configured to detect temperature of engine; and controller configured to control injector based on temperature detected by temperature sensor. Fuel injected by injector is at least one of gasoline fuel and reformed fuel obtained by reforming part of gasoline fuel into peroxide. Controller controls injector so as to inject gasoline fuel at first target injection timing when temperature detected by temperature sensor exceeds predetermined temperature at starting of engine, and controls injector so as to inject reformed fuel at second target injection timing retarded from first target injection timing when temperature detected by temperature sensor is equal to or lower than predetermined temperature.

7 Claims, 7 Drawing Sheets

ENGINE CONTROL APPARATUS

CROSS-REFERENCE TO RELATED APPLICATION

This application is based upon and claims the benefit of priority from Japanese Patent Application No. 2023-051060 filed on Mar. 28, 2023, the content of which is incorporated herein by reference.

BACKGROUND OF THE INVENTION

Field of the Invention

The present invention relates to an engine control apparatus.

Description of the Related Art

Conventionally, there is known an engine that performs homogenous charge compression ignition (HCCI) combustion in which an air-fuel mixture of fuel and air is compressed and self-ignited. For example, in an engine described in JP 2019-105227 A, gasoline fuel is injected into a combustion chamber from an injector during an intake stroke or a compression stroke, and the injected gasoline fuel is mixed with air introduced into the combustion chamber and then self-ignited in the vicinity of a compression top dead center. Further, at the time of cold start of the engine, ignition assist of the air-fuel mixture by the ignition plug is performed.

However, in the device described in JP 2019-105227 A, gasoline fuel having low ignitability is used. For this reason, even if the air-fuel mixture is ignited by the ignition plug, there is a possibility that flame cannot sufficiently grow and misfire occurs at the time of the cold start.

SUMMARY OF THE INVENTION

An aspect of the present invention is an engine control apparatus, including: an engine including an injector configured to inject fuel into a combustion chamber and an ignition plug configured to ignite air-fuel mixture of the fuel and air in the combustion chamber; a temperature sensor configured to detect a temperature of the engine; and a controller configured to control the injector based on the temperature detected by the temperature sensor. The fuel injected by the injector is at least one of gasoline fuel and reformed fuel obtained by reforming a part of the gasoline fuel into peroxide. The controller controls the injector so as to inject the gasoline fuel at a first target injection timing when the temperature detected by the temperature sensor exceeds a predetermined temperature at a starting of the engine, and controls the injector so as to inject the reformed fuel at a second target injection timing retarded from the first target injection timing when the temperature detected by the temperature sensor is equal to or lower than the predetermined temperature.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 10. An engine control apparatus according to the embodiment of the present invention is applied to a spark ignition type engine or a homogenous charge compression ignition type engine mounted on a vehicle, and performs engine control for improving startability at the time of cold start.

Normal octane gasoline fuel has low ignitability, and even if an air-fuel mixture is ignited by an ignition plug, there is a possibility that flame cannot sufficiently grow and misfire occurs at the time of the cold start. Therefore, in the present embodiment, the engine control apparatus is configured as follows so that the startability at the time of the cold start can be improved by using reformed fuel in which a part of the gasoline fuel is reformed into a peroxide as necessary.

Figure 1:
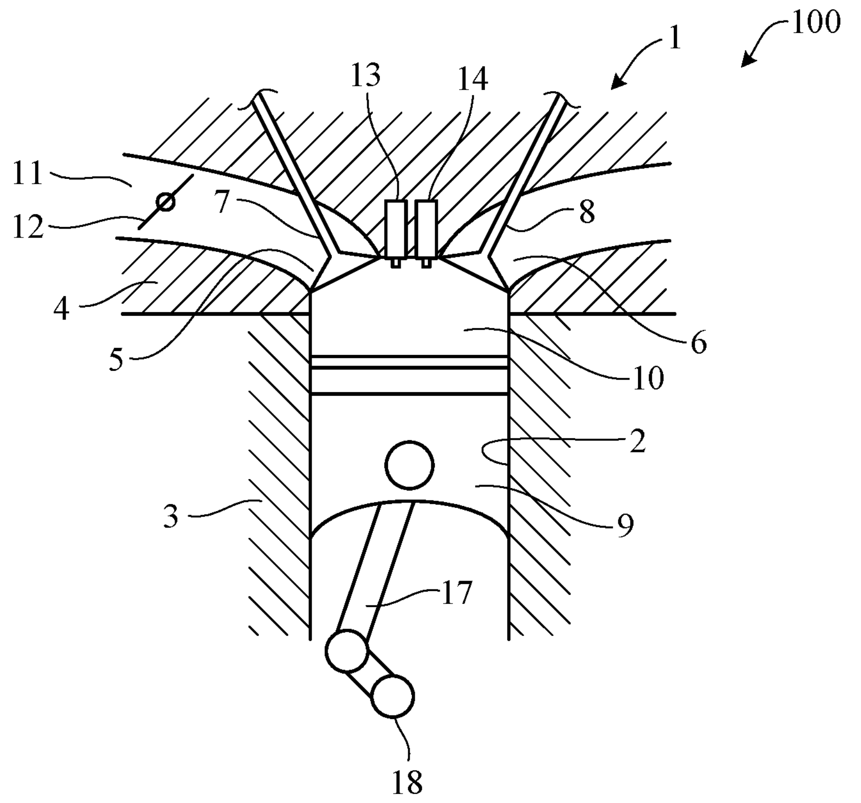
FIG. 1 is a diagram schematically illustrating an example of an internal configuration of an engine of an engine control apparatus according to an embodiment of the present invention.

FIG. 1 is a diagram schematically illustrating an example of an internal configuration of an engine 1 of an engine control apparatus (hereinafter, referred to as the apparatus) 100 according to the embodiment of the present invention. As illustrated in FIG. 1, the engine 1 includes a cylinder block 3 in which cylinders 2 are provided, and a cylinder head 4 that covers an upper portion of the cylinder block 3. The cylinder head 4 is provided with an intake port 5 through which intake air to the engine 1 passes and an exhaust port 6 through which exhaust air from the engine 1 passes. The intake port 5 is provided with an intake valve 7 that opens and closes the intake port 5, and the exhaust port 6 is provided with an exhaust valve 8 that opens and closes the exhaust port 6. The intake valve 7 and the exhaust valve 8 are driven to be opened and closed by a valve mechanism (not illustrated).

Figure 3:
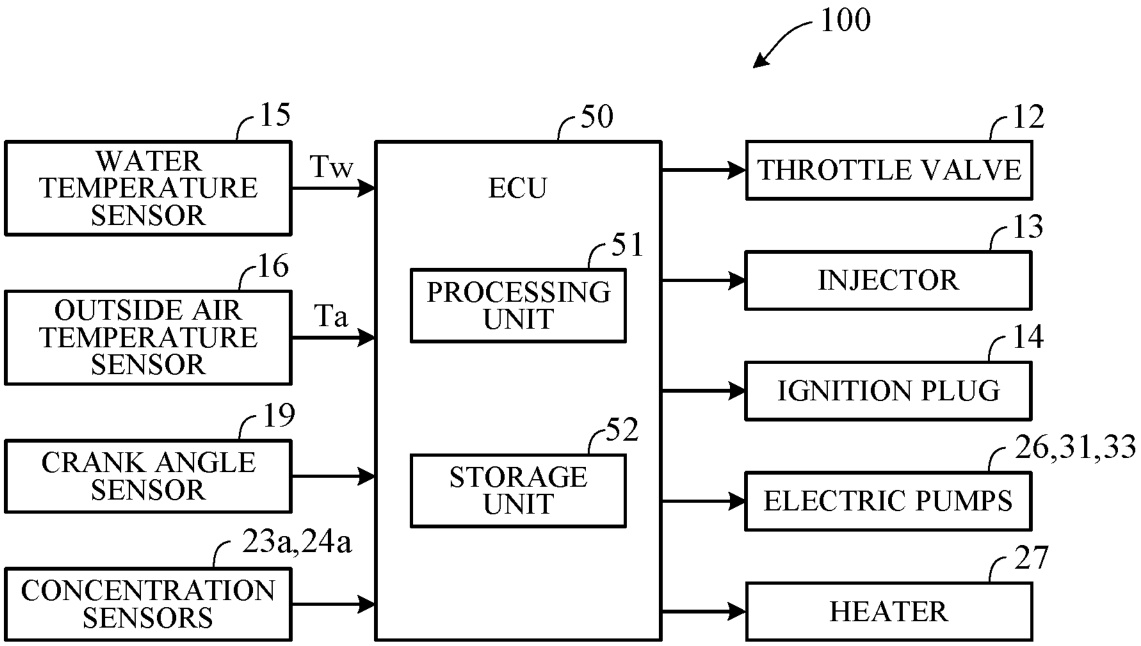
FIG. 3 is a block diagram schematically illustrating an example of a configuration of a main portion of the engine control apparatus according to the embodiment of the present invention.

In each cylinder 2, a piston 9 is disposed slidably within the cylinder 2, and a combustion chamber 10 is provided facing the piston 9. A throttle valve 12 is provided in an intake passage 11 communicating with the combustion chamber 10 through the intake port 5. The throttle valve 12 includes, for example, a butterfly valve, and the amount of air (intake amount) sucked into the combustion chamber 10 is adjusted by the throttle valve 12. An opening (throttle opening) of the throttle valve 12 is controlled by an electronic control unit (ECU) 50 (FIG. 3).

An injector 13 and an ignition plug 14 are attached to the cylinder head 4 so as to face the combustion chamber 10. The injector 13 is configured as a cylinder injection type fuel injection valve, and injects fuel into the combustion chamber 10. The ignition plug 14 generates a spark by electric energy and ignites the air-fuel mixture in the combustion chamber 10. The fuel injection timing (valve opening timing) of the injector 13, the fuel injection amount (valve opening time), the ignition timing of the ignition plug 14, and on/off of ignition by the ignition plug 14 are controlled by the ECU 50 (FIG. 3). Although not illustrated, the engine 1 is also provided with a water temperature sensor 15 (FIG. 3) that detects a temperature (water temperature) Tw of engine cooling water, an outside air temperature sensor 16 (FIG. 3) that detects an intake air temperature (outside air temperature) Ta, and the like. Signals indicating detection results by the water temperature sensor 15 and the outside air temperature sensor 16 are transmitted to the ECU 50 (FIG. 3).

When the intake port 5 is opened, the exhaust port 6 is closed, and the piston 9 descends, air (fresh air) is sucked into the combustion chamber 10 from the intake port 5 (intake stroke). When the intake port 5 and the exhaust port 6 are closed and the piston 9 ascends, the air or air-fuel mixture in the combustion chamber 10 is compressed, and the pressure in the combustion chamber 10 gradually increases (compression stroke).

In the spark ignition type engine, fuel is injected from the injector 13 into the combustion chamber 10 in the intake stroke or the compression stroke, the air-fuel mixture is ignited by the ignition plug 14 in the vicinity of a compression top dead center (TDC), and the fuel in the combustion chamber 10 is combusted by the flame propagation. Such combustion is hereinafter referred to as spark ignition (SI) combustion.

In the homogenous charge compression ignition type engine, the fuel is injected from the injector 13 into the combustion chamber 10 in the intake stroke or the compression stroke, and when the temperature rises by compressing the air-fuel mixture in the combustion chamber 10, the fuel is combusted by self-ignition in the vicinity of the compression top dead center (TDC). Such combustion is hereinafter referred to as homogenous charge compression ignition (HCCI) combustion.

In a case of performing the HCCI combustion, the air-fuel mixture is ignited by the ignition plug 14 in the vicinity of the compression top dead center (TDC) at the time of the cold start, a part of the fuel in the combustion chamber 10 is combusted by the flame propagation, and the remaining fuel is combusted by self-ignition in the combustion chamber 10 having a high temperature by the combustion. Such combustion is hereinafter referred to as spark assist homogeneous charge compression ignition (SAHCCI) combustion.

When the fuel is combusted in the combustion chamber 10, the pressure in the combustion chamber 10 rapidly rises, and the piston 9 descends (expansion stroke). When the intake port 5 is closed, the exhaust port 6 is opened, and the piston 9 ascends, air (exhaust air) in the combustion chamber 10 is discharged from the exhaust port 6 (exhaust stroke). When the piston 9 reciprocates along the inner wall of the cylinder 2, a crank shaft 18 rotates via a connecting rod 17. The crank shaft 18 of the engine 1 is also provided with a crank angle sensor 19 that detects a rotation angle (crank angle) of the crank shaft 18. A signal indicating a detection result by the crank angle sensor 19 is transmitted to the ECU 50 (FIG. 3).

Figure 10:
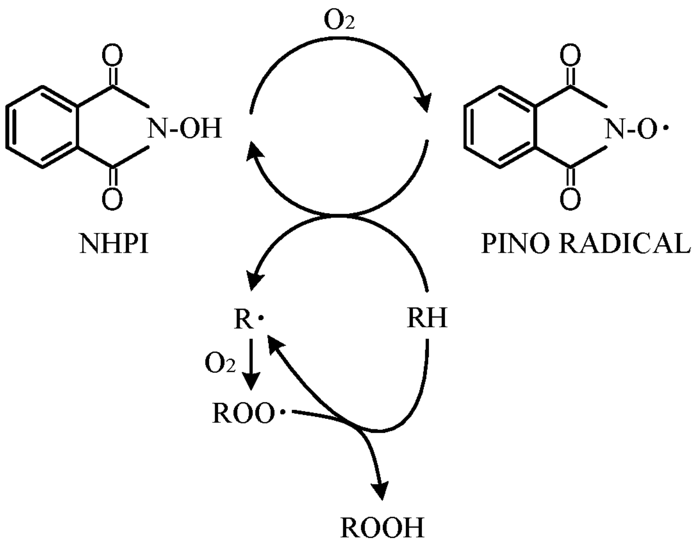
FIG. 10 is a diagram for explaining a chemical reaction when the fuel is reformed.

FIG. 10 is a diagram for explaining a chemical reaction when the fuel is reformed. Gasoline fuel containing a hydrocarbon as a main component is oxidatively reformed using a catalyst such as N-hydroxyphthalimide (NHPI) to produce a peroxide, so that ignitability thereof can be improved. Specifically, with NHPI, a hydrogen molecule is easily extracted using an oxygen molecule to produce a phthalimide-N-oxyl (PINO) radical. With the PINO radical, a hydrogen molecule is extracted from a hydrocarbon (RH) contained in the fuel to produce an alkyl radical (R·). The alkyl radical is bonded to an oxygen molecule to produce an alkyl peroxy radical (ROO·). With the alkyl peroxy radical, a hydrogen molecule is extracted from a hydrocarbon contained in the fuel to produce an alkyl hydroperoxide (ROOH) to be a peroxide, for example, a cumene hydroperoxide.

When the oxidation reaction proceeds, the peroxide concentration increases, and when the oxidation reaction further proceeds, the peroxide is decomposed into oxides such as alcohol, aldehyde, and ketone, and the peroxide concentration decreases and the oxide concentration increases. In order to increase the peroxide concentration in the fuel and improve the ignitability of the fuel, it is necessary to adjust the degree of progress of the oxidation reaction within an appropriate range. Specifically, it is necessary to adjust the peroxide concentration in reformed fuel obtained by oxidatively reforming a part of gasoline fuel to a predetermined concentration or more so that the octane number of the reformed fuel becomes a predetermined value or less.

Figure 2:
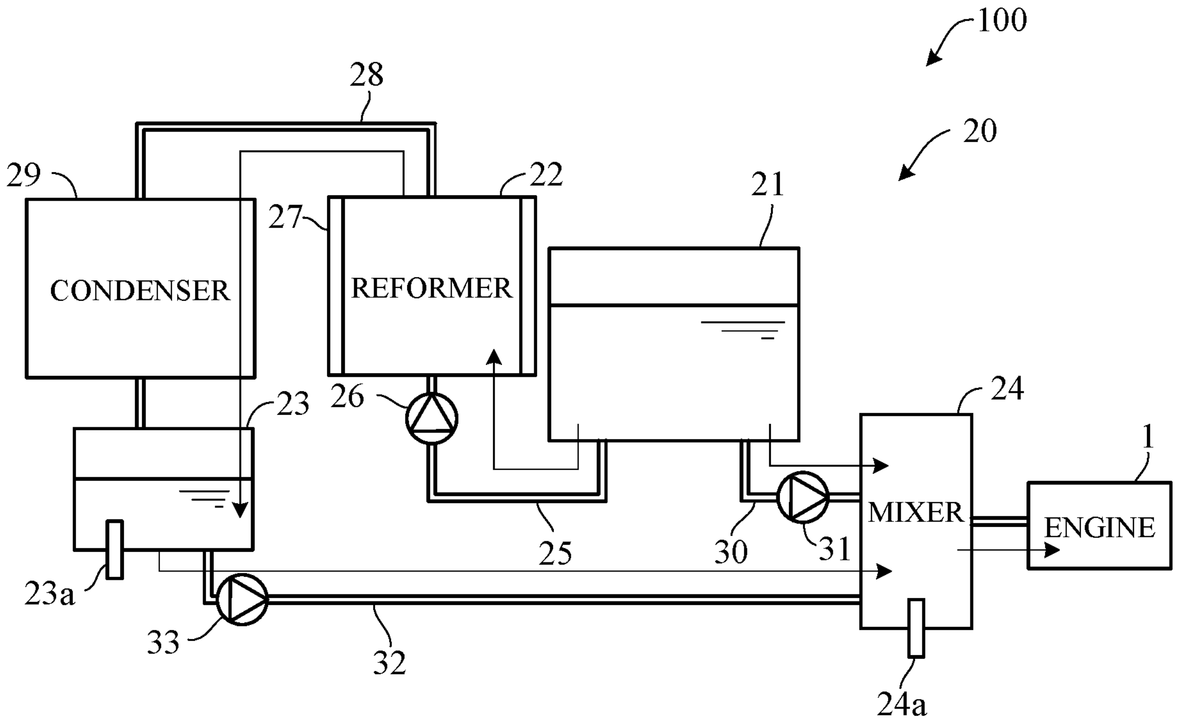
FIG. 2 is a diagram schematically illustrating an example of a fuel supply path for supplying fuel to the engine of the engine control apparatus according to the embodiment of the present invention.

FIG. 2 is a diagram schematically illustrating an example of a fuel supply path 20 for supplying fuel to the engine 1 of the apparatus 100. As illustrated in FIG. 2, the fuel supply path 20 is provided with a fuel tank 21 that stores gasoline fuel, a reformer 22 that oxidatively reforms the gasoline fuel, a reformed fuel tank 23 that stores the reformed fuel, and a mixer 24 that mixes the gasoline fuel and the reformed fuel. The mixed fuel mixed by the mixer 24 is injected into the combustion chamber 10 of the engine 1 through the injector 13 (FIG. 1).

A liquid phase of the fuel tank 21 and an inlet of the reformer 22 are connected via a pipe 25, and the gasoline fuel stored in the fuel tank 21 is supplied to the reformer 22 through the pipe 25 by an electric pump 26 provided in the pipe 25. The operation of the electric pump 26 is controlled by the ECU 50 (FIG. 3).

The reformer 22 is filled with a catalyst such as NHPI. The reformer 22 is provided with a heater 27 that adjusts the temperature of the reformer 22, and oxidatively reforms a part of gasoline fuel supplied from the fuel tank 21 into a peroxide at a reforming rate according to the temperature. The reformed fuel after the oxidative reforming includes a peroxide such as a cumene hydroperoxide in a ratio according to the reforming rate. The operation of the heater 27 is controlled by the ECU 50 (FIG. 3).

An outlet of the reformer 22 and the reformed fuel tank 23 are connected via a pipe 28. The reformed fuel reformed by the reformer 22 is supplied to the reformed fuel tank 23 through the pipe 28. A condenser 29 is provided in the pipe 28 between the reformer 22 and the reformed fuel tank 23. The reformed gaseous fuel is condensed by the condenser 29 and stored as a liquid in the reformed fuel tank 23. The reformed fuel tank 23 is provided with, for example, a capacitance type concentration sensor 23*a*, and the concentration sensor 23*a* detects the peroxide concentration C1 of the reformed fuel stored as a liquid in the reformed fuel tank 23. A signal indicating a detection result by the concentration sensor 23*a* is transmitted to the ECU 50 (FIG. 3).

The liquid phase of the fuel tank 21 is further connected to the mixer 24 via a pipe 30. The gasoline fuel stored in the fuel tank 21 is supplied to the mixer 24 through the pipe 30 by an electric pump 31 provided in the pipe 30. The liquid phase of the reformed fuel tank 23 is connected to the mixer 24 via a pipe 32. The reformed fuel stored in the reformed fuel tank 23 is supplied to the mixer 24 through the pipe 32 by an electric pump 33 provided in the pipe 32. The operations of the electric pumps 31 and 33 are controlled by the ECU 50 (FIG. 3). The mixer 24 is provided with, for example, a capacitance type concentration sensor 24*a*, and the concentration sensor 24*a* detects the peroxide concentration C2 of the mixed fuel. A signal indicating a detection result by the concentration sensor 24*a* is transmitted to the ECU 50 (FIG. 3).

FIG. 3 is a block diagram schematically illustrating an example of a configuration of a main portion of the apparatus 100. As illustrated in FIG. 3, the apparatus 100 mainly includes the ECU 50, and the ECU 50 includes a computer having a processing unit 51 such as a CPU, a storage unit 52 such as a ROM or a RAM, and other peripheral circuits (not illustrated) such as an I/O interface. The ECU 50 may be configured as a part of an engine control ECU that controls the operation of the engine 1.

The water temperature sensor 15, the outside air temperature sensor 16, the crank angle sensor 19, and the concentration sensors 23*a* and 24*a* are electrically connected to the ECU 50, and signals from the respective sensors are input to the ECU 50. Further, actuators of the throttle valve 12, the injector 13, the ignition plug 14, the electric pumps 26, 31, and 33, and the heater 27 are electrically connected to the ECU 50, and a control signal is transmitted from the ECU 50 to each actuator.

The ECU 50 controls the opening of the throttle valve 12, the fuel injection timing and the fuel injection amount of the injector 13, the ignition timing of the ignition plug 14, on and off of ignition by the ignition plug 14, and the like according to the operating conditions of the engine 1 such as the engine speed and the required torque. The target opening of the throttle valve 12, the target fuel injection timing and the target fuel injection amount of the injector 13, the target ignition timing of the ignition plug 14, and the like are determined in advance according to the operating conditions of the engine 1, and are stored in the storage unit 52 of the ECU 50 as a characteristic map and the like. The ECU 50 controls the electric pump 26 and the heater 27 such that the peroxide concentration C1 of the reformed fuel detected by the concentration sensor 23*a* is equal to or more than a predetermined concentration corresponding to a predetermined octane number. As a result, the reformed fuel having the peroxide concentration C1 equal to or more than the predetermined concentration and the octane number equal to or less than the predetermined value is stored in the reformed fuel tank 23.

Figure 4:
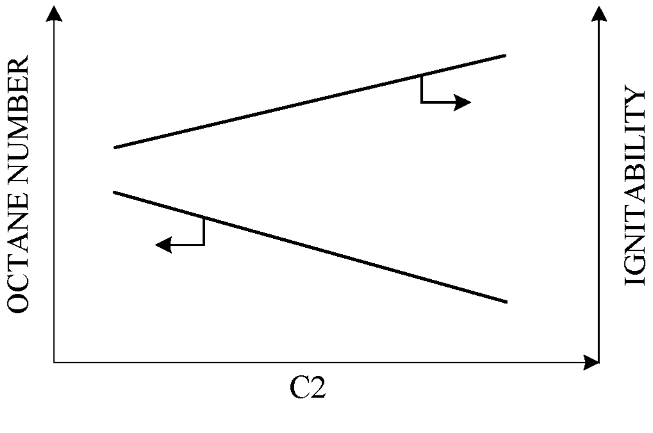
FIG. 4 is a diagram for explaining relation between peroxide concentration in the fuel and the octane number and ignitability.

FIG. 4 is a diagram for explaining a relation between the peroxide concentration C2 in the fuel supplied to the engine 1 and the octane number and the ignitability. As illustrated in FIG. 4, the higher the peroxide concentration C2, the lower the octane number and the higher the ignitability.

Figure 5:
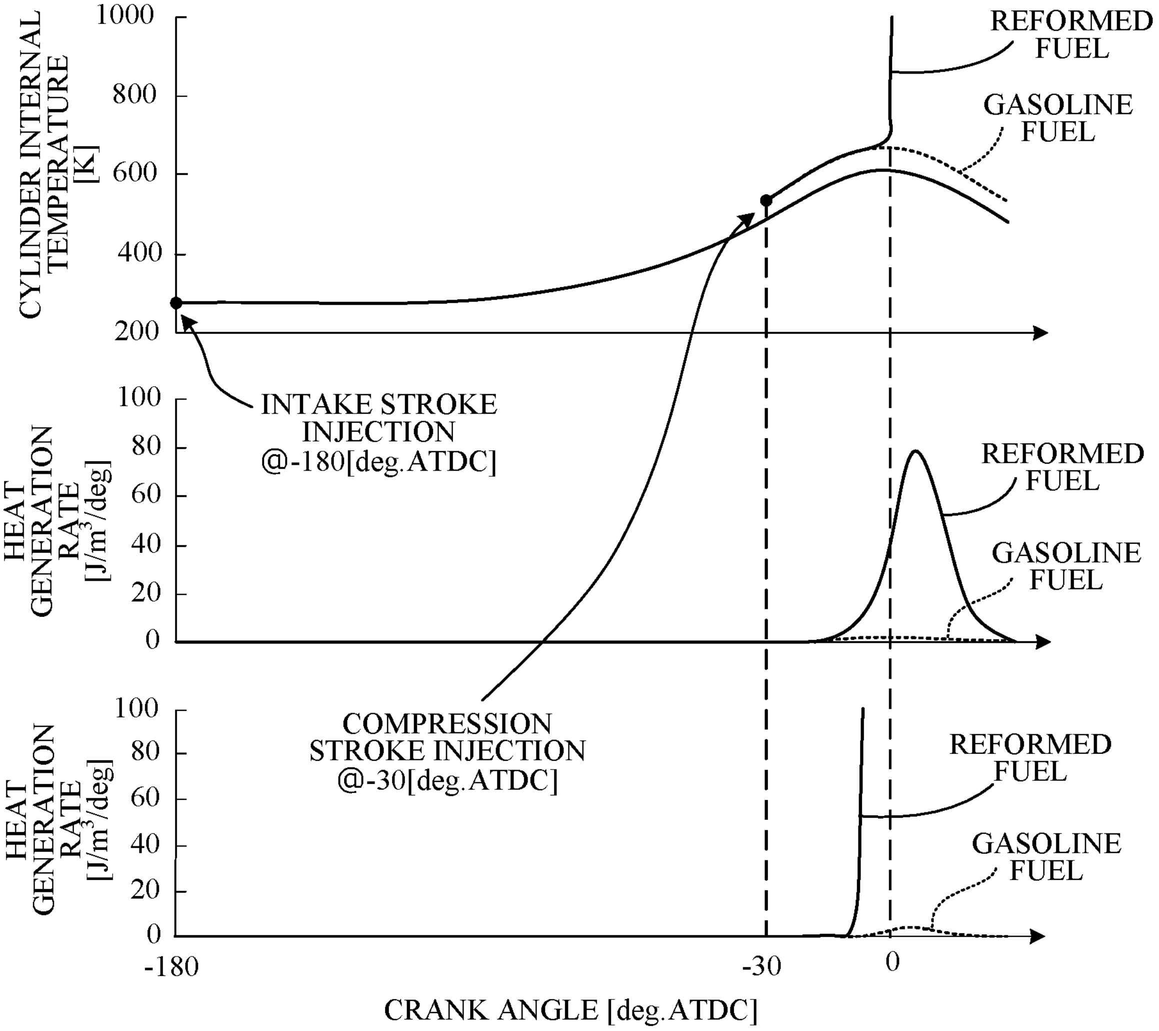
FIG. 5 is a diagram for explaining relation between fuel injection timing, and cylinder internal temperature and heat generation rate.

FIG. 5 is a diagram for explaining a relation between fuel injection timing, and a cylinder internal temperature and a heat generation rate, and illustrates a calculation result when the air-fuel mixture is compressed under normal pressure and low temperature (−30° C.) conditions. As illustrated in FIG. 5, in the gasoline fuel, in both a case of intake stroke injection in which the fuel is injected at a crank angle of −180 degrees based on the compression top dead center (TDC) and a case of compression stroke injection in which the fuel is injected at −30 degrees, a rapid temperature rise in the cylinder internal temperature due to the ignition of the fuel was not observed. In addition, it was confirmed that, in both the case of the intake stroke injection and the case of the compression stroke injection, heat generation was hardly observed in the vicinity of the compression top dead center (TDC), and a low-temperature oxidation reaction, which is an exothermic reaction generated by a slow oxidation reaction of fuel molecules, hardly proceeded.

On the other hand, in the case of the compression stroke injection, a rapid temperature rise due to ignition was observed in the vicinity of the compression top dead center (TDC) in the reformed fuel. In addition, it was confirmed that, in both the case of the intake stroke injection and the case of the compression stroke injection, heat generation was observed in the vicinity of the compression top dead center (TDC), and the low-temperature oxidation reaction proceeded. In addition, it was confirmed that, in the case of the compression stroke injection, a rapid increase in the heat generation rate was observed in the vicinity of the compression top dead center (TDC), and the combustion reaction started in addition to the low-temperature oxidation reaction.

Figure 6:
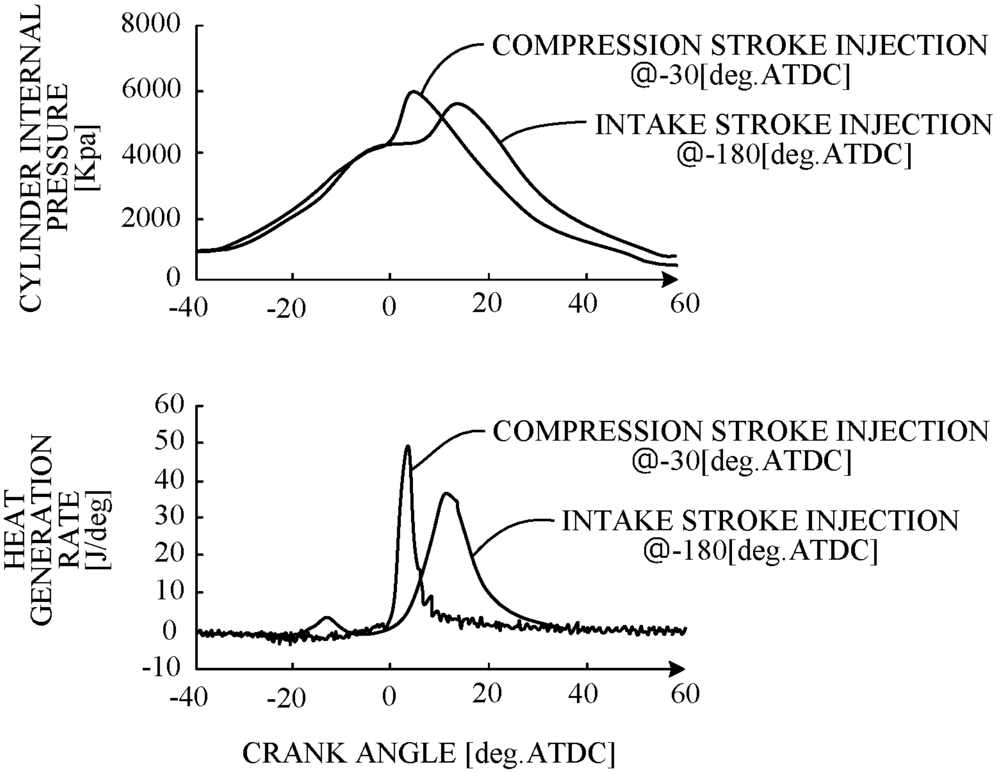
FIG. 6 is a diagram for explaining relation between the fuel injection timing, and cylinder internal pressure and the heat generation rate.

FIG. 6 is a diagram for explaining a relation between the fuel injection timing, and the cylinder internal pressure and the heat generation rate, and illustrates changes in the cylinder internal pressure and the heat generation rate when the reformed fuel is injected under a condition of the intake pressure of 130 [kPa]. As illustrated in FIG. 6, in the case of the compression stroke injection in which the fuel is injected at −30 degrees, a rapid increase in the cylinder internal pressure due to ignition was observed in the vicinity of the compression top dead center (TDC). When the injection timing is retarded and the fuel injection is performed in the latter half of the compression stroke, the fuel is injected in a state where air in the cylinder is compressed and the cylinder internal temperature is increased, and the fuel distribution in the cylinder becomes non-uniform. Therefore, the low-temperature oxidation reaction sufficiently proceeds, and the cylinder internal temperature can be increased to the temperature leading to self-ignition.

When the engine 1 starts, the ECU 50 determines whether or not the cold start is performed based on the water temperature Tw detected by the water temperature sensor 15 and the outside air temperature Ta detected by the outside air temperature sensor 16. More specifically, when the water temperature Tw is equal to or lower than a first predetermined water temperature Tw1 and the outside air temperature Ta is equal to or lower than a predetermined outside air temperature Ta1, it is determined that the cold start is performed, and when the water temperature Tw exceeds the first predetermined water temperature Tw1 or the outside air temperature Ta exceeds the predetermined outside air temperature Ta1, it is determined that the normal start is performed. The first predetermined water temperature Tw1 is the water temperature Tw at the time of the cold start, and the predetermined outside air temperature Ta1 is the outside air temperature Ta at the time of the cold start.

When it is determined that the normal start is performed, the ECU 50 controls the electric pumps 31 and 33 and the injector 13 so as to inject the gasoline fuel at normal target injection timing (hereinafter, referred to as first target injection timing). More specifically, the electric pump 33 is turned off, the electric pump 31 is turned on, the gasoline fuel stored in the fuel tank 21 is guided to the injector 13 as it is, and the injector 13 is controlled to inject the gasoline fuel at the first target injection timing.

When it is determined that the cold start is performed, the ECU 50 controls the electric pumps 31 and 33 and the injector 13 so as to inject the reformed fuel at second target injection timing retarded from the first target injection timing. More specifically, the electric pump 31 is turned off, the electric pump 33 is turned on, the reformed fuel stored in the reformed fuel tank 23 is guided to the injector 13, and the injector 13 is controlled to inject the gasoline fuel at the second target injection timing. When the remaining amount of the reformed fuel stored in the reformed fuel tank 23 is insufficient, the electric pump 31 may be turned on in addition to the electric pump 33 to guide the mixed fuel of the gasoline fuel and the reformed fuel to the injector 13.

Figure 7:
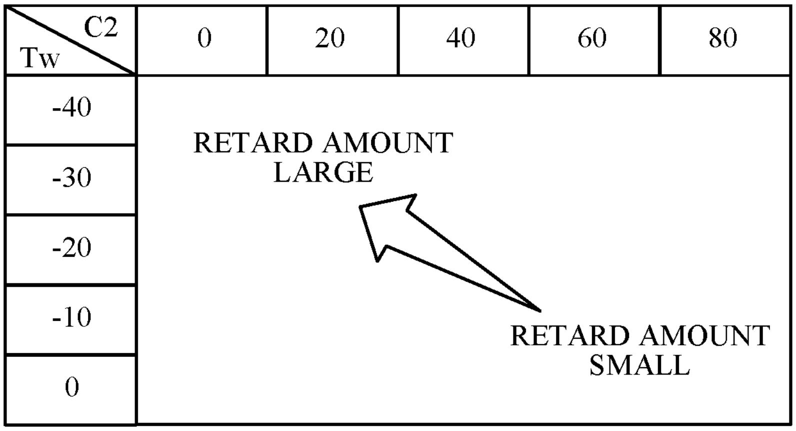
FIG. 7 is a diagram for explaining the injection timing at the time of the cold start.

FIG. 7 is a diagram for explaining the injection timing at the time of the cold start, and illustrates an example of a characteristic map of a retard amount of the second target injection timing with respect to the first target injection timing. As illustrated in FIG. 7, the retard amount of the second target injection timing with respect to the first target injection timing is set so that it is increased as the water temperature Tw of the engine 1 is lowered and the peroxide concentration C2 in the fuel supplied to the engine 1 is lowered. Such a characteristic map is set in advance and stored in the storage unit 52 of the ECU 50. The ECU 50 (processing unit 51) calculates the retard amount with reference to the characteristic map stored in the storage unit 52 based on the water temperature Tw detected by the water temperature sensor 15 and the peroxide concentration C2 detected by the concentration sensor 24*a*, and calculates the second target injection timing.

In the engine 1 that uses the gasoline fuel at the time of normal operating, the injection timing is retarded from that in normal start at the time of the cold start, and the reformed fuel having high ignitability is injected into the combustion chamber 10 in which the intake air is compressed and the temperature becomes relatively high, so that the startability can be improved.

In a case where the engine 1 is configured by the homogenous charge compression ignition type engine, when it is determined that the cold start is performed, the ECU 50 controls the ignition plug 14 so as to ignite the air-fuel mixture of the reformed fuel and the air in the combustion chamber 10 in addition to the supply of the reformed fuel and the retard of the injection timing described above. That is, the engine 1 is controlled to perform the SAHCCI combustion.

After the supply of the reformed fuel, the retard of the injection timing, and the execution of the SAHCCI combustion described above, the ECU 50 determines whether or not the ignition by the ignition plug 14 has succeeded in a predetermined number of combustion cycles based on, for example, the variation of the crank angle detected by the crank angle sensor 19. When it is determined that the ignition has succeeded in the predetermined number of combustion cycles and the engine 1 has been reliably started, the ECU 50 controls the electric pumps 31 and 33 and the injector 13 so as to terminate the supply of the reformed fuel and the retard of the injection timing and inject the gasoline fuel at the first target injection timing. After the engine 1 is reliably started, by switching to gasoline fuel injection at normal ignition timing, it is possible to improve thermal efficiency of the engine 1.

In a case where the engine 1 is configured by the homogenous charge compression ignition type engine, the ECU 50 controls the ignition plug 14 so as to stop ignition under a condition that the water temperature Tw exceeds a second predetermined water temperature Tw2 higher than the first predetermined water temperature Tw1. In a state where the water temperature Tw exceeds the second predetermined water temperature Tw2 and the cylinder internal temperature exceeds the predetermined temperature, when the SAHCCI combustion involving ignition is continued, there is a high possibility that knocking occurs. The second predetermined water temperature Tw2 is the water temperature Tw corresponding to a predetermined cylinder internal temperature at which the possibility of knocking increases. When the water temperature Tw exceeds the second predetermined water temperature Tw2, the ignition is ended, and the combustion mode is switched from the SAHCCI combustion to the HCCI combustion with high thermal efficiency, so that the possibility of knocking can be reduced, and the thermal efficiency of the engine 1 can be further improved.

Figure 8:
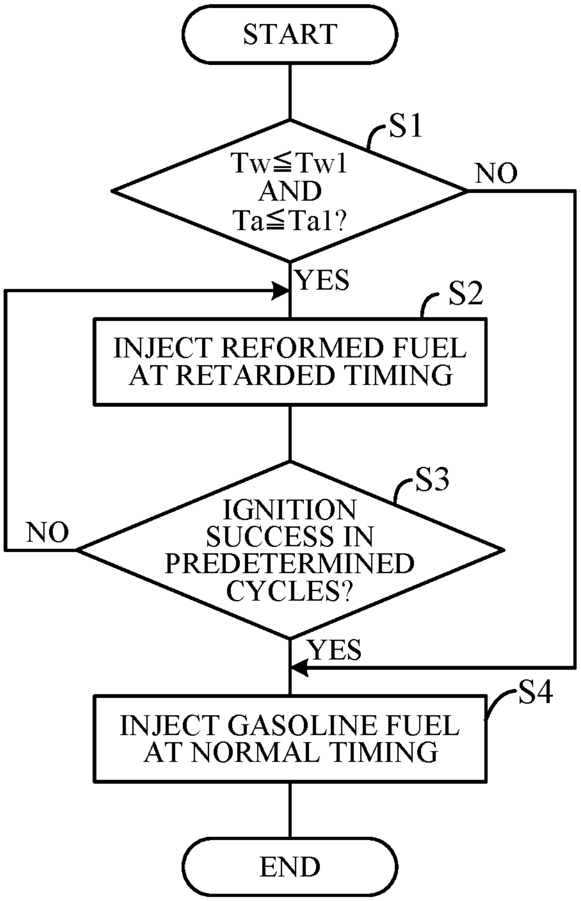
FIG. 8 is a flowchart illustrating an example of start processing when the engine control apparatus according to the embodiment of the present invention is applied to a spark ignition type engine.

FIG. 8 is a flowchart illustrating an example of start processing when the apparatus 100 is applied to the spark ignition type engine, and illustrates an example of start processing executed by the ECU 50 (processing unit 51) of FIG. 3. The start processing of FIG. 8 is executed when the engine 1 is started. As illustrated in FIG. 8, first, in S1 (S: processing step), a signal from each sensor is read, and it is determined whether or not the water temperature Tw is equal to or lower than the first predetermined water temperature Tw1 and the outside air temperature Ta is equal to or lower than the predetermined outside air temperature Ta1. When the determination result is YES in S1, it is determined that the cold start is performed, and the process proceeds to S2. When the determination result is NO in S1, it is determined that the normal start is performed, and the process proceeds to S4.

In S2, the electric pumps 31 and 33 and the injector 13 are controlled so as to inject the reformed fuel at the second target injection timing. Next, in S3, it is determined whether or not the ignition by the ignition plug 14 has succeeded in a predetermined number of combustion cycles. When the determination result is NO in S3, the process returns to S2 to continue the supply of the reformed fuel and the retard of the injection timing. When the determination result is YES in S3, the process proceeds to S4. In S4, the electric pumps 31 and 33 and the injector 13 are controlled so as to inject the gasoline fuel at the first target injection timing.

Figure 9:
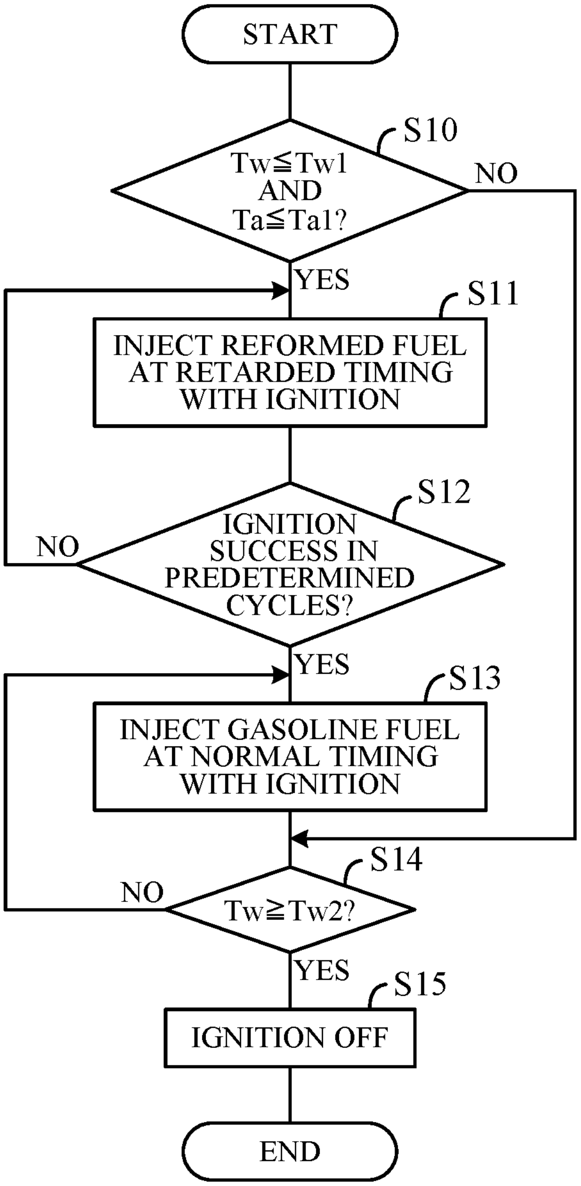
FIG. 9 is a flowchart illustrating an example of start processing when the engine control apparatus according to the embodiment of the present invention is applied to a homogenous charge compression ignition type engine.

FIG. 9 is a flowchart illustrating an example of start processing when the apparatus 100 is applied to the homogenous charge compression ignition type engine, and illustrates an example of start processing executed by the ECU 50 (processing unit 51) of FIG. 3. The start processing of FIG. 9 is executed when the engine 1 is started. As illustrated in FIG. 9, first, in S10, a signal from each sensor is read, and it is determined whether or not the water temperature Tw is equal to or lower than the first predetermined water temperature Tw1 and the outside air temperature Ta is equal to or lower than the predetermined outside air temperature Ta1. When the determination result is YES in S10, it is determined that the cold start is performed, and the process proceeds to S11. When the determination result is NO in S10, it is determined that the normal start is performed, and the process proceeds to S14.

In S11, the electric pumps 31 and 33 and the injector 13 are controlled to inject the reformed fuel at the second target injection timing, and the ignition plug 14 is controlled to ignite the air-fuel mixture of the reformed fuel and the air in the combustion chamber 10. That is, the engine 1 is controlled to perform the SAHCCI combustion by the reformed fuel. Next, in S12, it is determined whether or not the ignition by the ignition plug 14 has succeeded in a predetermined number of combustion cycles. When the determination result is NO in S12, the process returns to S11 to continue the SAHCCI combustion by the reformed fuel. When the determination result is YES in S12, the process proceeds to S13.

In S13, the electric pumps 31 and 33 and the injector 13 are controlled to inject the gasoline fuel at the first target injection timing, and the ignition plug 14 is controlled to ignite the air-fuel mixture of the gasoline fuel and the air in the combustion chamber 10. That is, the engine 1 is controlled to perform the SAHCCI combustion by the gasoline fuel. Next, in S14, it is determined whether or not the water temperature Tw exceeds the second predetermined water temperature Tw2. When the determination result is NO in S14, the process returns to S13 to continue the SAHCCI combustion by the gasoline fuel. When the determination result is YES in S14, the process proceeds to S15, and the engine 1 (ignition plug 14) is controlled to stop the ignition and switch the combustion mode from the SAHCCI combustion by the gasoline fuel to the HCCI combustion by the gasoline fuel.

According to the present embodiment, the following functions and effects can be achieved.

(1) The apparatus 100 includes the engine 1 having the injector 13 that injects fuel into the combustion chamber 10 and the ignition plug 14 that ignites the air-fuel mixture of the fuel and the air in the combustion chamber 10, the water temperature sensor 15 that detects the water temperature Tw of the engine 1, and the ECU 50 that controls the injector 13 based on the water temperature Tw detected by the water temperature sensor 15 (FIGS. 1 and 3). The fuel injected from the injector 13 is at least one of the gasoline fuel and the reformed fuel obtained by reforming a part of the gasoline fuel into the peroxide (FIG. 2).

The ECU 50 controls the injector 13 so as to inject the gasoline fuel at the first target injection timing when the water temperature Tw detected by the water temperature sensor 15 exceeds the first predetermined water temperature Tw1 at the time of starting the engine 1, and controls the injector 13 so as to inject the reformed fuel at the second target injection timing retarded from the first target injection timing when the water temperature Tw detected by the water temperature sensor 15 is equal to or lower than the first predetermined water temperature Tw1 (S1, S2, and S4 in FIG. 8, and S10, S11, and S13 in FIG. 9). In the engine 1 that uses the gasoline fuel at the time of normal operating, the injection timing is retarded from that in normal start at the time of the cold start, and the reformed fuel having high ignitability is injected into the combustion chamber 10 in which the intake air is compressed and the temperature becomes relatively high, so that the startability can be improved.

(2) The engine 1 is a spark ignition type engine, and the first predetermined water temperature Tw1 is the water temperature Tw at the time of the cold start of the engine 1. The ECU 50 controls the injector 13 so as to inject the reformed fuel at the second target injection timing, and then controls the injector 13 so as to inject the gasoline fuel at the first target injection timing when ignition by the ignition plug 14 succeeds in a predetermined number of combustion cycles (S3 and S4 in FIG. 8). After the engine 1 is reliably started, by switching to gasoline fuel injection at normal ignition timing, it is possible to improve thermal efficiency of the engine 1.

(3) The engine 1 is a homogenous charge compression ignition type engine. When the water temperature Tw detected by the water temperature sensor 15 is equal to or lower than the first predetermined water temperature Tw1, the ECU 50 controls the ignition plug 14 so as to ignite the air-fuel mixture of the reformed fuel and the air in the combustion chamber 10 (S10 and S11 in FIG. 9). At the time of the cold start of the homogenous charge compression ignition type engine, the startability can be further improved by switching to the SAHCCI combustion in which ignition is performed in addition to the supply of the reformed fuel and the retard of the injection timing.

(4) The first predetermined water temperature Tw1 is the water temperature Tw at the time of the cold start of the engine 1. The ECU 50 controls the injector 13 so as to inject the reformed fuel at the second target injection timing and controls the ignition plug 14 so as to ignite the air-fuel mixture of the reformed fuel and the air in the combustion chamber 10. Then, when the ignition by the ignition plug 14 succeeds in a predetermined number of combustion cycles, the ECU 50 controls the injector 13 so as to inject the gasoline fuel at the first target injection timing and controls the ignition plug 14 so as to ignite the air-fuel mixture of the gasoline fuel and the air in the combustion chamber 10 (S11 to S13 in FIG. 9). After the engine 1 is reliably started, by switching to gasoline fuel injection at normal ignition timing, it is possible to improve thermal efficiency of the engine 1.

(5) When the ignition by the ignition plug 14 succeeds in a predetermined number of combustion cycles, the ECU 50 controls the ignition plug 14 so as to stop the ignition under a condition that the water temperature Tw detected by the water temperature sensor 15 exceeds the second predetermined water temperature Tw2 higher than the first predetermined water temperature Tw1 (S14 and S15 in FIG. 9). When the water temperature Tw exceeds the second predetermined water temperature Tw2, the ignition is ended, and the combustion mode is switched from the SAHCCI combustion to the HCCI combustion with high thermal efficiency, so that the possibility of knocking can be reduced, and the thermal efficiency of the engine 1 can be further improved.

In the above embodiment, the case where the engine 1 is the spark ignition type engine and the case where the engine 1 is the homogenous charge compression ignition type engine have been described, but the engine having the injector and the ignition plug is not limited thereto. For example, a plurality of combustion modes including the SI combustion and the HCCI combustion may be switched according to operating conditions.

In the above embodiment, the internal configuration of the engine 1 has been exemplified in FIG. 1 and the like, but the internal configuration of the engine such as the arrangement of the injector and the ignition plug is not limited to the illustrated internal configuration.

In the above embodiment, the example in which the reformed fuel reformed on board by the reformer 22 mounted on the vehicle is used has been described, but the reformed fuel obtained by reforming a part of the gasoline fuel into the peroxide is not limited thereto. For example, the reformed fuel may be a reformed fuel manufactured in advance and stored in an in-vehicle fuel tank.

In the above embodiment, the example in which the reformed fuel is stored in the reformed fuel tank 23, and the ECU 50 controls the electric pump 33 and the injector 13 and supplies the reformed fuel to the engine 1 has been described with reference to FIGS. 2, 3, and the like, but the control unit that controls the injector is not limited thereto. For example, the reformed fuel may be supplied to the engine 1 by controlling the electric pump 26 and the heater 27 instead of the electric pump 33 and switching on and off of the reformer 22 or adjusting the reforming rate or the reforming amount by the reformer 22. In this case, the reformed fuel tank 23 and the electric pump 33 may not be provided.

In the above embodiment, the example in which the mixer 24 for mixing the gasoline fuel and the reformed fuel is provided has been described with reference to FIG. 2 and the like, but the mixer 24 may not be provided when a sufficient amount of reformed fuel can be supplied.

In the above embodiment, the example of determining whether or not the cold start is performed based on the water temperature Tw and the outside air temperature Ta has been described with reference to FIGS. 8, 9, and the like, but the control unit that controls the injector based on the temperature of the engine is not limited thereto. For example, it may be determined whether or not the cold start is performed based only on the water temperature Tw.

The above embodiment can be combined as desired with one or more of the aforesaid modifications. The modifications can also be combined with one another.

According to the present invention, it becomes possible to improve startability at the time of cold start of the engine.

Above, while the present invention has been described with reference to the preferred embodiments thereof, it will be understood, by those skilled in the art, that various changes and modifications may be made thereto without departing from the scope of the appended claims.

The invention claimed is:

1. An engine control apparatus, comprising:

an engine including an injector configured to inject fuel into a combustion chamber and an ignition plug configured to ignite air-fuel mixture of the fuel and air in the combustion chamber;

a temperature sensor configured to detect a temperature of the engine; and a controller configured to control the injector based on the temperature detected by the temperature sensor, wherein the fuel injected by the injector is at least one of gasoline fuel and reformed fuel obtained by reforming a part of the gasoline fuel into peroxide, wherein the controller:

controls the injector so as to inject the gasoline fuel at a first target injection timing when the temperature detected by the temperature sensor exceeds a predetermined temperature at a starting of the engine; and controls the injector so as to inject the reformed fuel at a second target injection timing retarded from the first target injection timing when the temperature detected by the temperature sensor is equal to or lower than the predetermined temperature.

2. The engine control apparatus according to claim 1, wherein the engine is a spark ignition type engine.

3. The engine control apparatus according to claim 2, wherein the temperature is a temperature of cooling water of the engine, wherein the predetermined temperature is the temperature of the cooling water at cold starting of the engine, wherein the controller:

controls the injector to inject the reformed fuel at the second target injection timing; and when ignition by the ignition plug succeeds in a predetermined number of combustion cycles, controls the injector to inject the gasoline fuel at the first target injection timing.

4. The engine control apparatus according to claim 1, wherein the engine is a homogenous charge compression ignition type engine, wherein the controller further controls the ignition plug to ignite the air-fuel mixture of the reformed fuel and the air in the combustion chamber when the temperature detected by the temperature sensor is equal to or lower than the predetermined temperature.

5. The engine control apparatus according to claim 4, wherein the temperature is a temperature of cooling water of the engine, wherein the predetermined temperature is the temperature of the cooling water at cold starting of the engine, wherein the controller:

controls the injector to inject the reformed fuel at the second target injection timing and controls the ignition plug to ignite the air-fuel mixture of the reformed fuel and the air in the combustion chamber; and when ignition by the ignition plug succeeds in a predetermined number of combustion cycles, controls the injector to inject the gasoline fuel at the first target injection timing and controls the ignition plug to ignite the air-fuel mixture of the gasoline fuel and the air in the combustion chamber.

6. The engine control apparatus according to claim 5, wherein the predetermined temperature is a first predetermined temperature, wherein the controller controls the ignition plug to stop ignition under a condition that the temperature detected by the temperature sensor exceeds a second predetermined temperature higher than the first predetermined temperature when ignition by the ignition plug succeeds in a predetermined number of combustion cycles.

7. The engine control apparatus according to claim 1, wherein the reformed fuel contains the peroxide of a predetermined concentration or more, wherein an octane number of the reformed fuel is lower than an octane number of the gasoline fuel.

* * * * *